United States Patent [19]

Palmer

[11] Patent Number: 5,787,443
[45] Date of Patent: Jul. 28, 1998

[54] METHOD FOR DETERMINING DATABASE ACCURACY

[75] Inventor: Douglas C. Palmer, Austin, Tex.

[73] Assignee: Cooperative Computing, Inc., Austin, Tex.

[21] Appl. No.: 557,284

[22] Filed: Nov. 14, 1995

[51] Int. Cl.$^6$ .................................................. G06F 17/30
[52] U.S. Cl. ........................ 707/202; 707/201; 707/10
[58] Field of Search ................................ 395/617, 618, 395/222; 707/202, 201, 10

[56] References Cited

U.S. PATENT DOCUMENTS

| | | | |
|---|---|---|---|
| 4,924,385 | 5/1990 | Dote | 707/1 |
| 5,129,082 | 7/1992 | Tirfling et al. | 395/617 |
| 5,274,802 | 12/1993 | Altine | 395/618 |
| 5,479,654 | 12/1995 | Squibb | 395/617 |
| 5,564,049 | 10/1996 | Schmidt | 707/104 |
| 5,586,304 | 12/1996 | Stupek, Jr. et al. | 395/712 |
| 5,592,375 | 1/1997 | Salmon et al. | 395/207 |

*Primary Examiner*—Wayne Amsbury
*Attorney, Agent, or Firm*—David H. Judson

[57] ABSTRACT

A method for determining database accuracy is disclosed which assists in finding errors in a reference database by making comparisons to an interchange database. The reference and interchange databases containing first and second groups of related data strings. The data strings from the first groups are compared to find matching data strings between the reference and interchange databases. The data strings in the second groups related to the matching data strings of the first groups are then compared to verify that they match. When no matching conditions are detected, an error indication is generated.

13 Claims, 2 Drawing Sheets

METHOD FOR DETERMINING DATABASE ACCURACY

TECHNICAL FIELD

The present invention relates generally to database quality management, and more particularly to a method of determining the accuracy of data in a database.

BACKGROUND OF THE INVENTION

The errors and omissions that occur in electronic databases vary considerably depending upon the process used to enter the data and on how the initial data is transformed to create the final electronic database. The process of data entry begins with the data originator who may provide data containing errors and omissions which have not been corrected before the data reaches an electronic database vendor. If the electronic database is created by manually transcribing a printed document such as a catalog, transcription errors can occur. If the electronic database is loaded from electronic media provided by the data originator, transcription errors are avoided but other data errors may be introduced by the computer equipment during data conversion and the electronic database would still include original data errors. Another problem arising during electronic conversion arises from the practice of transforming received data in the format provided by the data originator to a format required by electronic database users. The transformation may involve changing the data values to produce the desired result. This provides another entry point for possible errors.

Two commonly occurring errors which are very difficult to find are called "inverted values" and "omissions". Inverted values occur during data creation or manual transcription when for example, the data string "abc 123" becomes the data string "abc 132". This is a difficult error to detect when the inverted value is valid but is in the wrong place. Omissions are classic quality control problems caused when particular values are left out of a data string. These are difficult errors to detect and it is almost always easier to find existing errors in data and correct them rather than determine what information may have been left out.

Numerous quality assurance or other correction processes have been developed to help prevent and find these type of data entry errors. An example of one of these procedures involves double keying data that is manually transcribed. In this procedure, two different people key in the same data and the results are then compared to detect differences between the two sets of entered data. In another method, data can be compared to a pre-existing list to see if the entered data values are valid. Both of these methods are time and labor intensive methods for assuring quality of the electronic database.

SUMMARY OF THE INVENTION

The present invention overcomes the foregoing and other problems with a method for determining database accuracy by detecting data entry errors within a database. The method utilizes a pair of databases wherein the first, or reference, database contains a master data listing of primary data ordered by broad categories and including references to interchange data which may be substituted for the primary data. The second, or interchange, database includes specific listings of interchange data which may be substituted for the primary data. Initially, a block of interchange data associated with the primary data is determined. The interchange information from the first database is compared to a group of data blocks within the second database to locate the corresponding information data within the second database. The interchange data within the second database has primary data uniquely associated with each piece of interchange data. The primary data located in the second database is compared with the primary data associated with the compared interchange data in the first database to determine if the data matches.

If the compared primary data from both the first and second databases match, this provides an indication of the accuracy of the data within the first database. Should there be no match between the compared primary data of the first and second databases, an indication of a possible error within the first database is generated. Also, a determination can be made as to whether each group of primary data within the first database has a uniquely associated group of interchange data associated therewith. Should a non-uniquely associated group of primary data be located, an error indication is generated.

The foregoing has outlined some of the more pertinent aspects of the present invention. These aspects should be construed to be merely illustrative of some of the more prominent features and applications of the invention. Many other beneficial results can be obtained by applying the disclosed invention in a different manner or modifying the invention as will be described. Accordingly, other aspects and a fuller understanding of the invention may be had by referring to the following detailed description of the preferred embodiment.

BRIEF DESCRIPTION OF THE DRAWINGS

For a more complete understanding of the present invention and the advantages thereof, reference should be made to the following detailed description taken in conjunction with the accompanying drawings in which.

DETAILED DESCRIPTION

Figure 1:
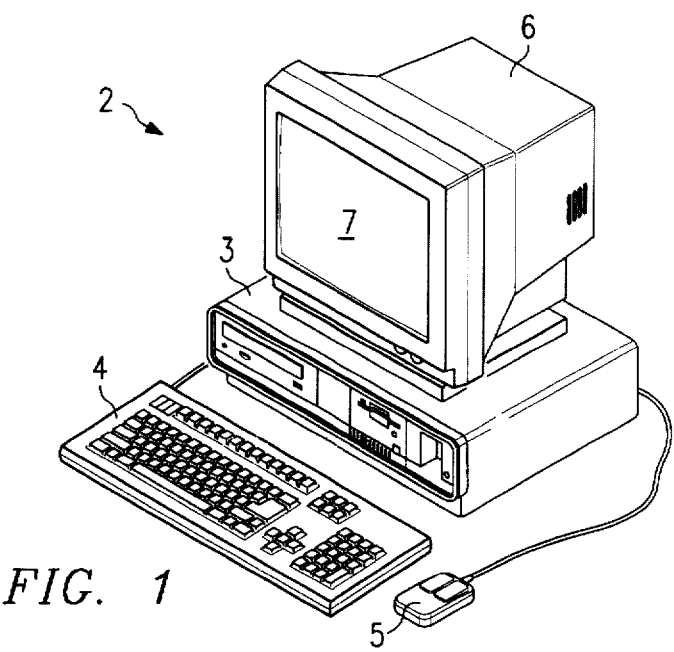
FIG. 1 is a diagram illustrating a computer for implementing the present invention.

Referring now to the drawings, and more particularly to FIG. 1, there is illustrated the environment of operation of the present invention. A computer 2 comprises a system unit 3, a keyboard 4, a mouse 5 and a display 6. The screen 7 of display 6 is used to present a graphical user interface (GUI). The graphical user interface supported by the operating system allows the user to use a point and shoot method of input, i.e., by moving the mouse pointer to an icon representing a data object in a particular location on the screen 7 and pressing the mouse buttons to perform a user command or selection. Alternatively, the data may be entered or accessed via entries on the keyboard 4.

Figure 2:
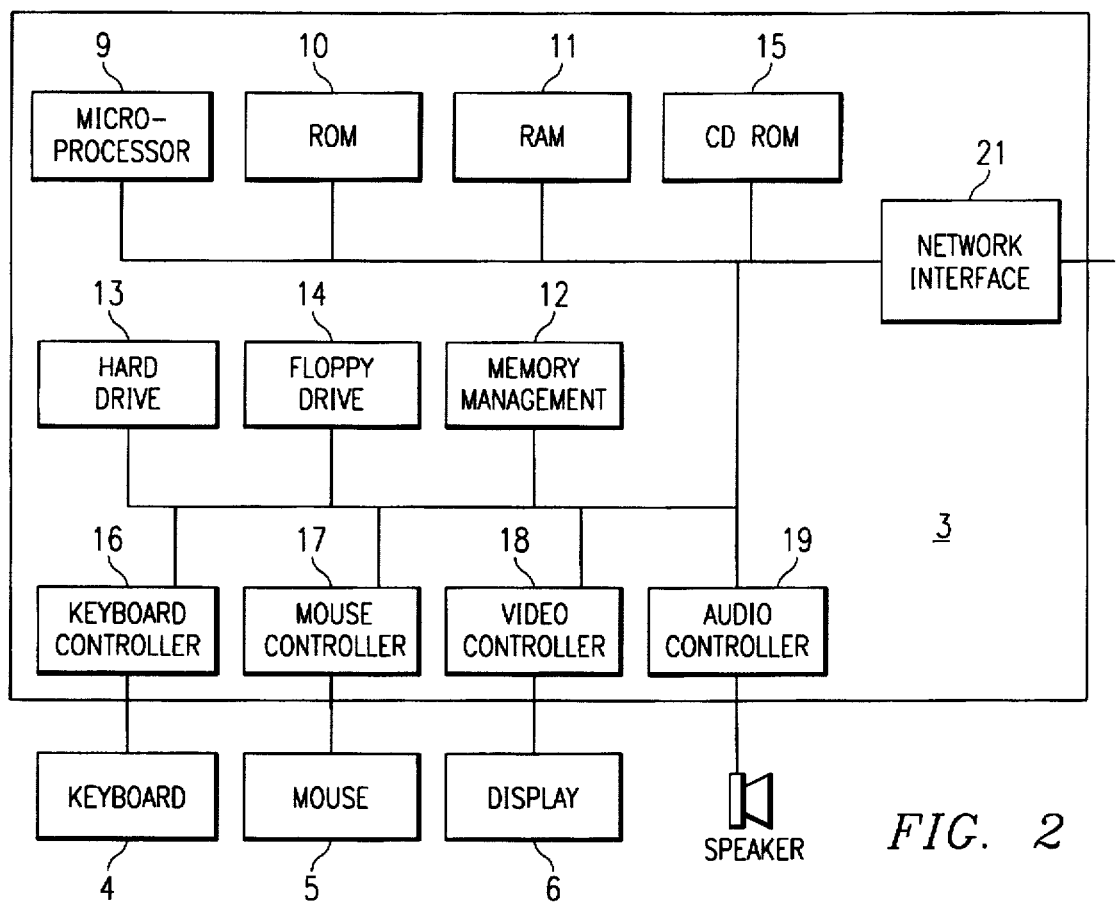
FIG. 2 is a block diagram of the computer illustrated in FIG. 1.

FIG. 2 illustrates a block diagram of the components of the personal computer as shown in FIG. 1. The system unit 3 includes a system bus or plurality of system buses 8 to which various components are coupled and communication between the various components are accomplished. A microprocessor 9 is connected to the system bus 8 and supported by a read only memory (ROM) 10 and a random access memory (RAM) 11.

The ROM 10 contains instructions for controlling basic hardware operations of the personal computer. The RAM 11 provides the main memory storage location into which the operating system and application programs are loaded. A memory management chip 12 is connected to the system bus 8 and controls memory access operations and data transfers between the RAM 11 hard drive 13 and floppy disk drive 14. A CD ROM storage device 15 stores exceptionally large databases, such as the catalogs which will be discussed shortly. Also connected to the system bus 8 are various input/output controllers such as the keyboard controller 16, mouse controller 17, video controller 18 and audio controller 19. These controllers provide hardware interfaces for the various input/out devices such as the keyboard 4, mouse 5, display 6 and speakers, respectively. A network interface 21 enables communication to local area networks and access to remote data.

Figure 3:
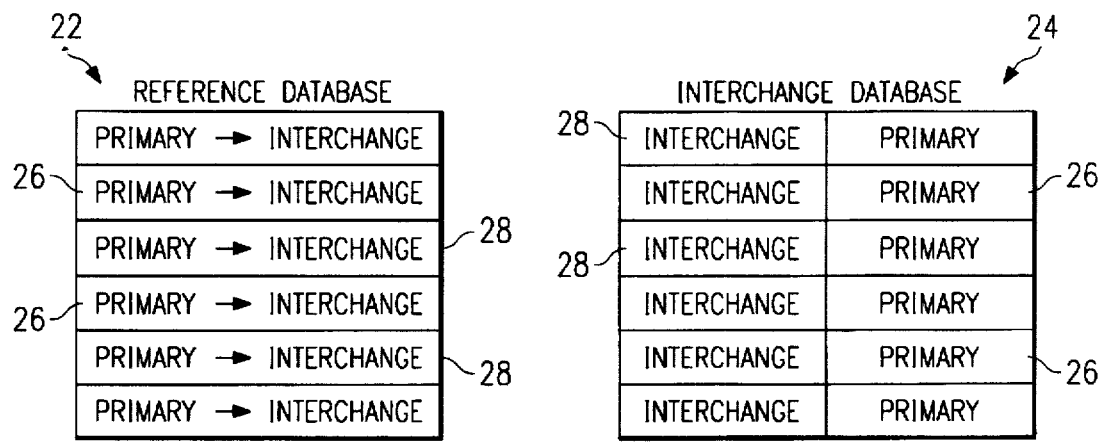
FIG. 3 illustrates the databases used for comparison by the method of the present invention.

Referring now to FIG. 3, there is illustrated a diagram of the databases used for comparison by the method of the present invention. The method enables the comparison of information within a reference database 22 to information in an interchange database 24. The reference database 22 includes primary data 26 having interchange data 28 associated therewith. The primary data 26 consist of broadly grouped data containing information about a particular topic. The interchange data 28 comprise related data uniquely associated with the primary data 26 that may be substituted for the primary data in some manner. For example, if the reference database 22 consisted of an electronic auto parts catalog, primary data 26 would include manufacturer auto parts data such as manufacturer name, part description, part number, and application information. The interchange data 28 associated with an electronic parts catalog would include a listing of competitors' products interchangeable with the specified manufacturer parts listed in the primary data 26. The interchange database 24 contains data related to the data contained in the reference database 22. In many cases, the interchange database will include the same data as the reference database 22 but will be specifically structured to indicate how interchange data may be substituted for primary data 26. Thus, while the reference database 22 may include broad groupings of data about several topics, the interchange data base 24 only contains information describing interchange data relationships with primary data. Thus, a user searching the interchange data 28 of the interchange database 24 will be able to find each piece of primary data 26 that a piece of interchange data may be substituted for. Normally, the primary information data 26 and interchange data 28 will be stored in separate but associated data groupings. However, it should be noted that this particular manner of storage is not required and any method of storage enabling access to the related primary data and interchange data would be acceptable. Continuing with the auto parts catalog example, the interchange database 24 would include interchange data 28 indicating competitors' parts that serve as replacements for manufacturer specified parts, and the primary data 28 would comprise the corresponding manufacturer parts for which the interchange parts were replaceable.

The rough data comprising the reference database 22 and interchange database 24 is provided to an electronic database managing facility so that the data may be integrated into a selected electronic database. The rough data comprising the reference database 22 and interchange database 24 may be provided by the same individuals or by separate individuals. Research has shown that the data contained within the interchange database 24 is normally more accurate than the reference database 22 data. Once the data has been entered or formatted into separate electronic databases by any of a variety of well known techniques, the method illustrated by FIG. 4 determines the accuracy of the information stored within the reference database 22.

Initially, the data within the reference database is referenced at Step 42 to confirm that the primary data 26 of the reference database is uniquely associated with optional information data 28. If a unit of primary information data 26 is determined to lack uniquely associated with interchange data 28, an indication of an error is generated at Step 44.

The associated interchange data 28 of the reference database 22 is compared at Step 46 to the interchange data 28 (or primary data depending upon the manner of data storage) of the interchange database 24 to find the interchange data of the interchange database containing interchange data matching the interchange data of the reference database. Any interchange data 28 of the reference database 22 not having matching interchange data in the interchange database 24 is indicated as containing possible errors. Next at Step 48, the primary data 26 of the interchange database 24 uniquely associated with the matched interchange data 28 of the interchange database 24 is compared to the corresponding primary data 26 of the matched optional information data of the reference database 22. If the reference database 22 is correct, the primary data 26 of the reference database and primary data 28 of the interchange database 24 should match. Any unmatched primary information data 26 of the reference database 22 indicates a potential problem and the unmatched data is identified for further action at Step 50.

Inquiry Step 52 determines if additional interchange databases 24 exist for comparison with the reference database 22. If so, the additional interchange databases 24 are accessed at Step 54 and control returns to Step 42 to compare the databases in the manner just described. Comparison to additional interchange databases 24 allows more accurate verification of errors in the reference database 22. For example, if the same unmatched primary data 26 is again located in a comparison to a second interchange database 24, a stronger indication of an error in the reference database 22 is provided. If no further interchange databases are present, the identified errors in the reference database 22 are either automatically corrected or displayed for human intervention to correct any non-matching designations at Step 56.

Referring again to the electronic auto parts catalog example discussed previously, the reference database 22 comprising the electronic auto parts manufacturers catalog would be referenced to locate the manufacturer auto part numbers corresponding to the primary data and the replacement part numbers comprising the interchange data. Thus, a spark plug having a manufacturer part number of R45 would be listed with the primary data and the replacement part number of A123 would be listed with the interchange data. The manufacturer part numbers are then checked to determine that each part number has corresponding replacement part numbers associated therewith in the reference database. In the case of the present example, the R45 manufacturer part number has the A123 replacement part number associated therewith. However, had the R45 number not had an associated replacement part number, an indication of this deficiency would have been generated.

Next, all replacement part numbers of the reference database are compared to the replacement part numbers in the interchange database to determine matches between replacement part numbers contained in both databases. The interchange database has data structured according to replacement part numbers with listings of the corresponding manufacturer's part numbers associated directly therewith. The manufacturer part numbers associated the matching replacement part numbers of the interchange database are compared to the corresponding manufacturer part number of the matched replacement part numbers of the reference database to confirm that the manufacturer part numbers match. Thus, in the present example, the A123 replacement part number of the primary database would be compared to replacement part numbers in the interchange database. When an A123 replacement part number was found in the interchange database, a determination would be made if an R45 manufacturer part number was associated with the A123 replacement part listing. If so, the accuracy of the reference database R45 manufacturer part number has been confirmed. Should the found manufacturer part number in the interchange database have been R14, an error indication would be generated for the R45 manufacturer part number listing of the reference database. Once an initial comparison between an electronic auto parts catalog and electronic interchange catalog has been made, additional comparisons with other electronic interchange catalogs can be made to further confirm the accuracy or inaccuracy of the electronic auto parts catalog.

Figure 4:
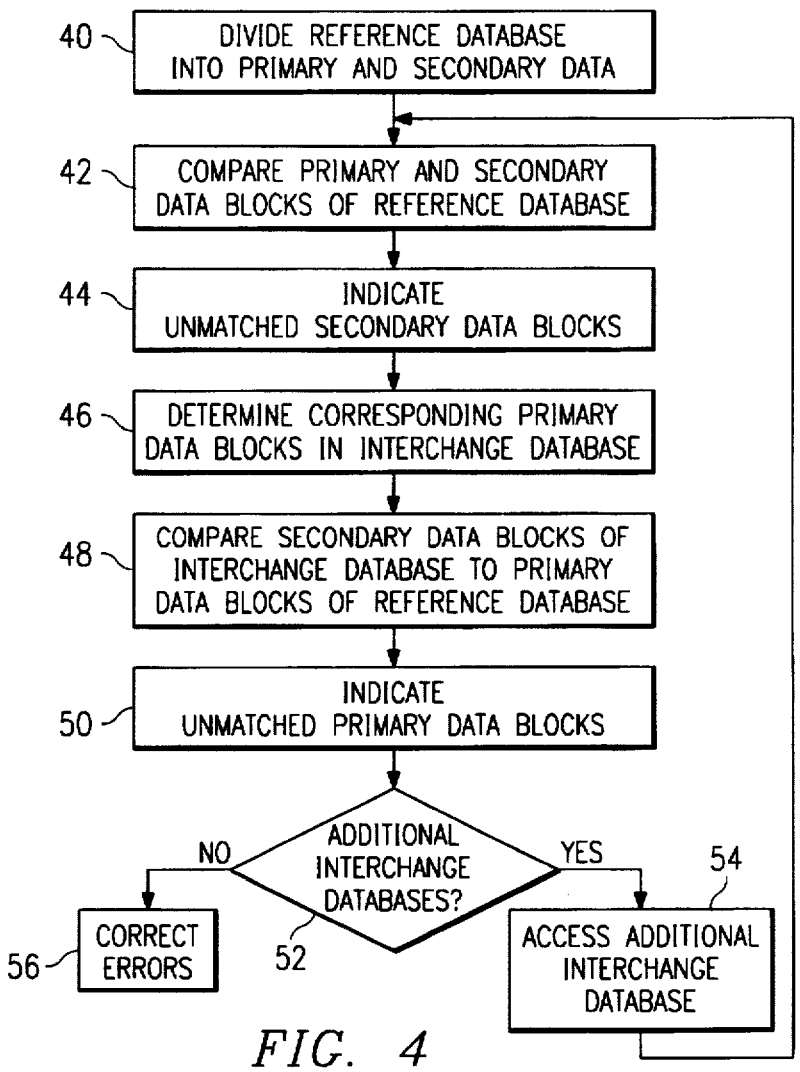
FIG. 4 is a flow diagram illustrating the method of the present invention.

After execution of the method described in FIG. 4, a Total Average Report or QC Report may be generated as one manner of displaying the error indications which have been generated.

| Message | Description |
|---------|-------------|
|         | were located in the reference database for this application, the part found in the interchange database was not located in the reference manufacturer part list. |
| msg3    | Indicates no interchange database part data was found for the competitive manufacturer part. |
| msg4    | Indicates the total number of reference manufacturer parts in the reference database and a list of those parts that matched one of the competitive manufacturer parts located in the reference database. |
| msg5    | Indicates the reference manufacturer part in the reference database that did not match any competitor parts in the reference data base. Also a total number of reference manufacturer parts are displayed with the number of parts that did match the interchange database data. |
| msg6    | Indicates a competitive manufacturer code was not found in the manufacturer conversion table. |

It should be appreciated by those skilled in the art that the specific embodiments disclosed above may be readily utilized as a basis for modifying or designing other structures for carrying out the purposes of they present invention. It should also be realized by those skilled in the art such equivalent constructions do not depart from the spirit and scope of the invention as set forth in the appended claims.

What is claimed is:

1. A method for detecting errors within a first database containing first and second groups of related data with a second database also containing the first and second groups Total Coverage msg1:
SUBMITTED COMP PART FOR PF: DGY 4050435    1 91–92 INTERCHANGED TO PART: DAY 5050435    NO DAY PARTS FOUND IN PF
msg2:
SUBMITTED COMP. PART FROM PF: GDY 4040310    1 92 INTERCHANGED TO PART: DAY 5040310    BUT NOT FOUND IN PF
msg3:                                                                    8 86–89 - NO IC MATCH FOR: DAY
SUBMITTED COMP. PART FROM PF: DM 280K3
msg4:
MATCHED: FROM TOTAL OF 1 PFR PART(S) IN PF, 1 INTERCHANGED WITH AT LEAST ONE COMPETITIVE PART
DAY 5030280    1 86–89
msg5:
** DAY 5030280    1 86–89 WAS IN PF BUT DID NOT INTERCHANGE WITH NAY COMPETITOR
FROM TOTAL OF 1 MFR PART(S) IN PF, 0 INTERCHANGED WITH AT LEAST ONE COMPETITIVE PART
msg6:
COMP. CODE DM NOT FOUND IN MFR CODE TABLE QC Report msg1:
SUBMITTED COMP. PART FOR PF: GDY 4050435    1 91–92 INTERCHANGED TO PART: DAY 5050435    NO DAY PARTS FOUND IN PF
msg2:
SUBMITTED COMP. PART FROM PF: GDY 4040310    I 92 INTERCHANGED TO PART: DAY 5040310    BUT NOT FOUND IN PF
msg5:
** DAY 5030280    I 86–89 WAS IN PF BUT DID NOT INTERCHANGE WITH ANY COMPETITOR
FROM TOTAL OF MFR PART(S) IN PF, 0 INTERCHANGED WITH AT LEAST ONE COMPETITIVE PART
msg6:
COMP. CODE DM NOT FOUND IN MFR CODE TABLE The information provided by the reports is more fully discussed as follows for an example which has compared reference and interchange databases for the auto parts catalog example.

| Message | Description |
|---------|-------------|
| msg1 | Indicates no reference manufacturer parts were found in the reference database for this application, but when the competitive manufacturer part was compared to the interchange database, an interchange part was found. |
| msg2 | Indicates that although some reference manufacturer parts | of related data, wherein the second database comprises a reference database of manufacturers auto part data and the first database comprises an interchange database of manufacturers auto part data, comprising the steps of:

(a) comparing data of the first group of the first database to the data of the first group of the second database to locate matching data in the second database;

(b) identifying data of the second group of the second database associated with the matching data of the second database;

(c) comparing the identified data to data of the second group of the first database associated with the matching data of the first group of the first database to verify a matching condition; and (d) generating an indication if no matching condition exists.

2. The method of claim 1 wherein the first group of data comprises manufacturer auto part data and the second group of data comprises auto part replacement data.

3. The method of claim 1 further including the step of associating the first and second data groups of the first database.

4. The method of claim 1 further including the steps of:

determining if the data of the first group of data has a uniquely associated data in the second group of data; and generating an indication if data of the first group of data does not have a uniquely associated data in the second group of data.

5. The method of claim 1 further including the step of verifying the previously detected non-matching conditions by repeating steps (a) through (d) to compare the first database to a third database containing the first and second groups of related data.

6. A method for detecting errors within a manufacturers auto parts catalogue database containing manufacturer part number data and associated replacement part number data by comparison with an interchange part number database containing interchange part number data with uniquely associated manufacturer part number data, comprising the steps:

comparing interchange part number data of the first database to the interchange part number data of the second database to locate matching data interchange part number data in the second database;

if matching interchange part number data is not located, generating an indication for the unmatched interchange part number data of the first database;

if matching data is located, identifying manufacturer part number data of the second database uniquely related to the matching interchange part number data of the second database;

comparing the identified manufacturer part number data of the second database to manufacturer part number data of the first database related to the matched interchange part number data of the first database to verify a matching condition; and generating an indication if no matching condition exists.

7. The method of claim 6 further including the step of associating the manufacturer part number data and interchange part number data of the first database into separate groups.

8. The method of claim 6 further including the steps of:

determining if the manufacturer part data of the first database has related interchange part number data in the first database; and generating an indication if manufacturer part data of the first database does not have related replacement part number data in the first database.

9. The method of claim 6 further including the step of verifying the previously detected non-matching conditions by comparing the first database to a third database containing interchange parts number data with uniquely associated manufacturer part number data.

10. A method for detecting errors within a reference database containing first and second groups of related data strings using an interchange database containing the first and second groups of related data strings, wherein the second group of data strings comprise manufacturer auto part reference numbers and the first group of data strings comprise replacement auto part reference numbers, and wherein each manufacturer auto part reference number in the first group has an associated replacement auto part reference number in the second group, comprising the steps of:

comparing a data string from the first group of the reference database to the data strings of the first group of the interchange database to determine a matching data string;

verifying related data strings of the matching data strings also; and generating an indication if the related data strings of the matching data strings do not match.

11. The method of claim 10 further including the step of determining that the data strings of the first group of the reference database have related data strings in the second group of the reference database.

12. The method of claim 10 further including the step of:

comparing the data string of the first group of the reference database to the data strings of the first group of a second interchange database to determine a matching data string; and verifying related data strings of the matching data strings also match.

13. The method of claim 10 further including the step of associating the first and second data strings of the first database into separate groups.

* * * * *